United States Patent
Dietrich et al.

(10) Patent No.: US 6,526,392 B1
(45) Date of Patent: Feb. 25, 2003

(54) METHOD AND SYSTEM FOR YIELD MANAGED SERVICE CONTRACT PRICING

(75) Inventors: Brenda Lynn Dietrich, Yorktown Heights, NY (US); Sarah Jean Hood, Woodbury, CT (US); Daeki Kim, Leonia, NJ (US); Russell A. Rushmeier, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,642

(22) Filed: Aug. 26, 1998

(51) Int. Cl.[7] .............................................. G06F 17/60
(52) U.S. Cl. ..................................................... 705/400
(58) Field of Search ............................. 705/400, 7, 8, 705/9, 10, 30; 370/369

(56) References Cited

U.S. PATENT DOCUMENTS

| | | | |
|---|---|---|---|
| 5,862,556 A | * 1/1999 | Tibi et al. ............... | 370/396 |
| 6,041,307 A | * 3/2000 | Ahuja et al. ............. | 705/8 |
| 6,230,144 B1 | * 5/2001 | Kilkki et al. ............. | 705/30 |

FOREIGN PATENT DOCUMENTS

WO      WO 98/21907      * 5/1998

OTHER PUBLICATIONS

Black, Henry; Black's Law Dictionary; 1990; West Publishing Company; Sixth Edition; pp. 322–326, 637 and 1369.*
Kotler; Marketing Management analysis, planning and control, Fifth Edition; pp. 216–222.*
Kotler; Marketing Management analysis, planning and control, Fifth Edition; pp. 197–215.*

* cited by examiner

Primary Examiner—Thomas A. Dixon
(74) Attorney, Agent, or Firm—Stephen C. Kaufman, Esq; McGinn & Gibb, PLLC

(57) ABSTRACT

A computer implemented method pertinent to yield managed service contract pricing. The method comprises the steps of inputting first information comprising a baseline profiling services contracted to zero or more existing customers; inputting second information comprising a profile of the services to be contracted to one or more new customers; and analyzing second information in the context of first information for the purpose of determining a range of prices to be considered for the services to be contracted.

19 Claims, 3 Drawing Sheets

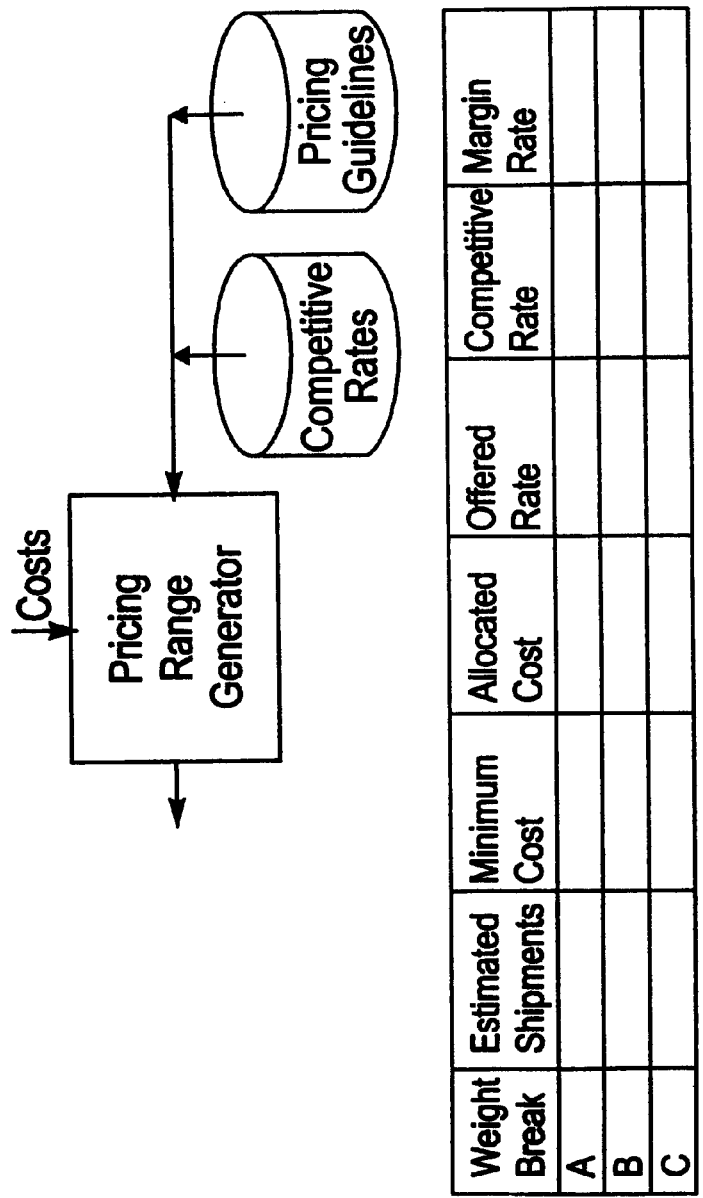

METHOD AND SYSTEM FOR YIELD MANAGED SERVICE CONTRACT PRICING

FIELD OF THE INVENTION

This invention relates to a method and system pertinent to yield managed service contract pricing.

BACKGROUND OF THE INVENTION

Organizations who provide services to customers periodically negotiate contracts for these services. Services include but are not limited to repair and maintenance, transportation of goods, transmission of data, warehousing, professional services such as medical care or consulting, and equipment or facilities use, such as hotels or rental cars. Services are distinguished from goods and materials in that services can not be built in advance and stored for future use.

Service contracts typically specify the type and level of service to be provided and the price to be paid for services to be delivered over the course of a contract horizon, usually a year or more. Many services are time sensitive, in that the service must be provided at a specific time or in a specific time interval. Many services are also location sensitive, in that service must be provided at a specific location. Note that the contract horizon (e.g., a year) spans a number of service delivery intervals (e.g., days) in which the contracted services are actually required.

SUMMARY OF THE INVENTION

We note that current contract pricing practice is to evaluate each new customer opportunity in isolation, and to consider the total or average service requirements of the customer, without detailed analysis of how these requirements are likely to be distributed across service intervals. We have ascertained that this practice fails to allow consideration of the fit of the customer with other related service activity that may be using the same resources, and fails to consider the peak resource levels needed to meet service requirements. The resource evaluation and resulting costs are therefore at best approximate, and may significantly under estimate (in the case of coinciding peak demands) or over estimate (in the case of complementary demand patterns) actual service costs.

These conditions indicate a need for novel methods for considering an accurate representation of a specific customer's detailed requirements, in the context of existing "baseline" activity.

A primary advantage of such a yield managed contract pricing system is that by looking at the combined detailed requirements, one can manage the overall net profitability (also known as margin or "yield") of the service organization's resources, in the critical customer pricing decision.

To this end, we have now discovered an invention subsuming novel methodology and system pertinent to yield managed service contract pricing.

In a first aspect, the invention includes a computer system comprising:

1) means for inputting first information comprising a baseline profiling services contracted to zero or more existing customers;
2) means for inputting second information comprising a profile of the services to be contracted to one or more new customers; and
3) means for analyzing second information in the context of first information for the purpose of determining a range of prices to be considered for the services to be contracted.

In a second aspect, the invention includes a computer implemented method comprising the steps of:

1) inputting first information comprising a baseline profiling services contracted to zero or more existing customers;
2) inputting second information comprising a profile of the services to be contracted to one or more new customers; and
3) analyzing second information in the context of first information for the purpose of determining a range of prices to be considered for the services to be contracted.

In a third aspect, the invention comprises a program storage device readable by a machine, tangibly embodying a program of instructions executable by the machine to perform method steps for yield managed service contract pricing, said method steps including:

1) inputting first information comprising a baseline profiling services contracted to zero or more existing customers;
2) inputting second information comprising a profile of the services to be contracted to one or more new customers; and
3) analyzing second information in the context of first information for the purpose of determining a range of prices to be considered for the services to be contracted.

BRIEF DESCRIPTION OF THE DRAWING

The invention is illustrated in the accompanying drawings, in which:

FIGS. 2 and 3 provide further details of the FIG. 1 architecture.

DETAILED DESCRIPTION OF THE INVENTION

Figure 1:
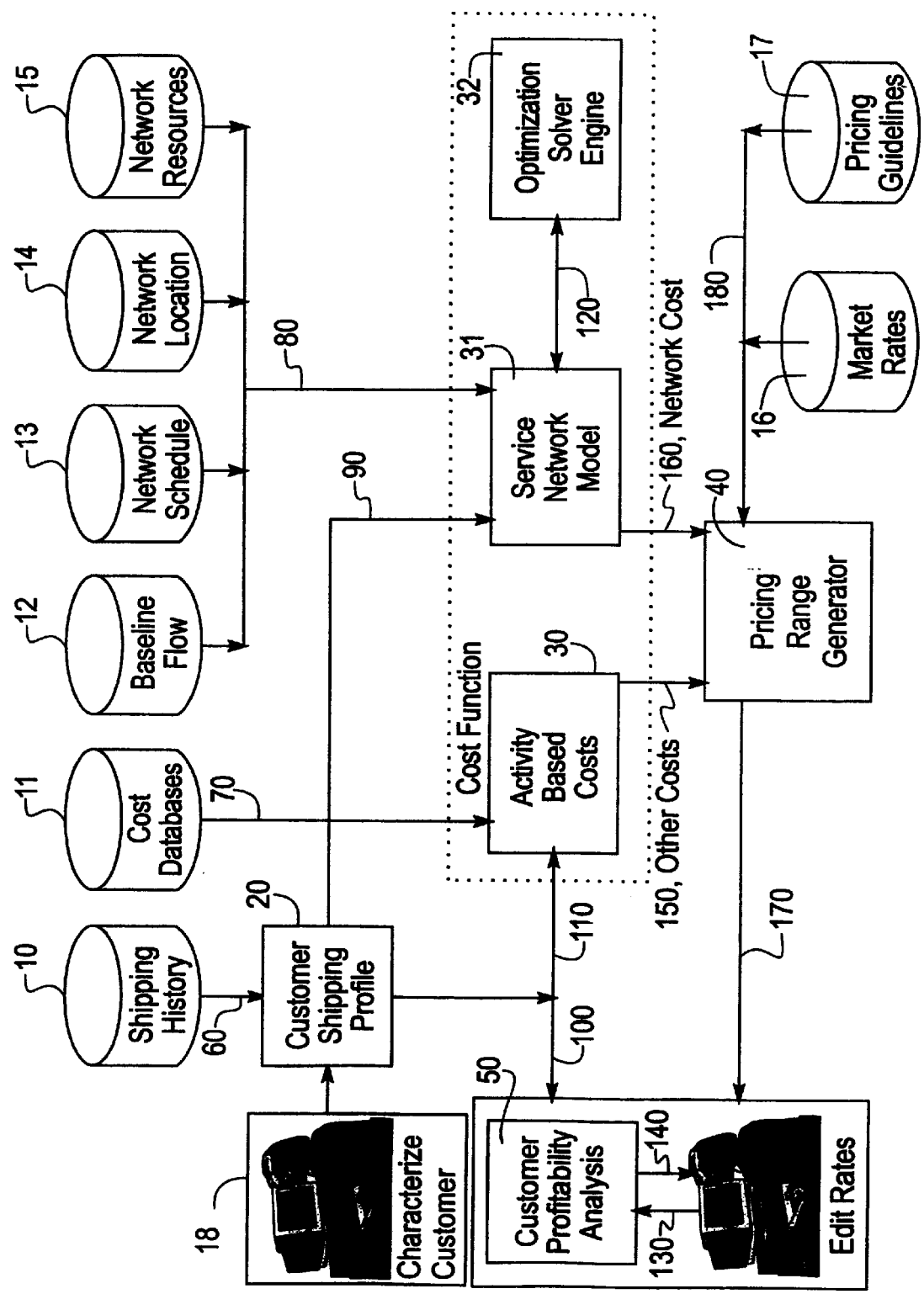
FIG. 1 shows a computer system architecture of the present invention.

The invention, as summarized above, comprises a method for pricing service contracts using detailed analysis of the demand over short time intervals to capture the variability. One feature of this invention is the use of the customer and baseline profiles with a service network model to evaluate the yield of specific pricing plans.

In particular, a yield managed service contract pricing system can determine a recommended range for pricing one or more services to be delivered as part of a customer contract. A pricing agent can uses this range, possibly in conjunction with other data, to determine the pricing plan specified in the contract, or as input to a contract negotiation process. In a yield managed service contract pricing system, analysis methods and software tools may be used to construct a profile of the customer activity within each service delivery interval over the duration of the contract horizon. This profile may be combined with a comparable profile of "baseline" activity for existing customers over this same horizon. Resource requirements for the combined customer and baseline activity are then evaluated, for such things as capacity utilization and cost, using a service network model or other costing method. Within a user defined scope, the service network model is capable of making resource allocation decisions that can "optimize" the handling of service activity. The resource requirements provided by the service network model may be used to estimate the profit margin, or "yield", for a pricing plan applied to the customer's profile. Using yield information in combination with other supplied information, such as competitive rates, existing customer pricing plans, and pricing guidelines, a recommended range for pricing plans may be determined, and made available to the pricing agent.

Before describing the invention in detail, we first define some terms that will be used throughout the description.

A service activity is the requirement for a specific service at a specific time or within a specific time interval in a specific location, such as, but not limited to, shipment of physical goods, transmission of information, use of equipment or facilities, or professional services. A service network is the set of one or more resources, and their associated location restrictions, that a service organization uses to perform services. The term "network" does not limit the invention to instances involving multiple physical locations. A service network is typically "capacitated" in that at least one resource is either available in limited quantity, or is available at an increasing marginal cost.

A cost function is a calculation that takes as an input a set of data describing one or more service activities and data describing a service network and produces as an output the cost of executing the service activities using the resources in the service network. In general the accuracy of the pricing calculations will depend directly on the accuracy of the cost function. Cost functions are typically specific to the type of service being provided and to the method of allocating the resources in the service network. Although we disclose, in the context of a specific example, a means of evaluating the incremental cost of a new customer through the use of a resource model and a method for calculating a minimum cost allocation of resources, this invention can use any available cost function, and is thus not limited to the use of the specific calculation described herein.

The methods disclosed here were developed in the context of pricing contracts for a transportation service. The transportation enterprise enters long-term contracts to transport goods for a customer. Such a contract typically specifies a formula for the price of transporting each unit of goods (e.g., a "package"), from each "origin" to each "destination" at each defined level of service. The pricing formula may involve some combination of a per package minimum cost as well as weight and dimension related costs. Origin-destination pairs are often aggregated into a few lanes, for example all traffic between North America and Europe might be priced according to the same formula. As input to the contract negotiation, a customer typically specifies an average (weekly, monthly, or annual) volume on each lane for a variety of package sizes and service levels. Additional demand detail, such as city to city demand and/or daily package volume ranges, may occasionally be provided. Resources in a transportation network include owned transportation vehicles such as vans, trucks, rail cars, planes, and ships that can be deployed whenever and wherever needed or according to a planned schedule; warehousing and sortation facilities associated with specific geographic locations (called "sites") that have a specified maximum capacity; and scheduled resources, such as cargo space on scheduled passenger airlines.

The contract pricing method preferably involves the following sequence of steps.

The first step is to read data associated with the service. This data includes the demand for the service activities, a description of the physical service network, network operating costs, and pricing guidelines.

The second step is to analyze the data to create customer profiles describing customer service activity.

The third step is to use a cost function to evaluate the incremental cost of adding a new customer to the service network.

The fourth step is to use the results of the third step and, optionally additional pricing guideline data to determine a price range for the service contract.

In the fifth step, this price range is provided to an end user (typically a pricing agent) through a reporting function or other interface.

The service network description involves information regarding physical sites or locations, links between the sites, and capacitated resource pools. The resource pools may be associated with one or more sites, one or more links, or may move around the network. In the case of a resource moving around the service network, the resource may move according to a specified schedule and possibly other constraints, or the resource may be redeployed to meet changing demand conditions.

The data for service activity involves the forecasted demand from one or more potential customers. It also includes the forecasted demand from zero or more existing customers already under contract. The existing customer demand establishes a baseline of committed service activities. It is assumed that at least some of the baseline data is available at the service interval granularity. That is, if a service interval consists of a single day, then some information on existing customer service activity is available for each day since the start of the contract.

The second step, customer profiling, consists of analyzing customer demand (forecast or historical) to statistically characterize the activity. The characterization may be done on both a time and location dimension. Averages, standard deviations, ranges, and trends are computed and standard statistical techniques are used to fit the existing data to a probability distribution. A new customer is profiled using any available data. The profile may actually be specified by the customer, or it may be generated from a combination of customer contract specifications, such as total monthly demand, and historical demand from this customer or a similar customer. In either case, the result is a customer profile detailing the anticipated service activity for each service delivery interval over the contract horizon.

The third step is to determine the incremental cost of adding a potential customer to the service provider's capacitated network. The cost function must deal with the variability in demand over time or space rather than simply some average or aggregated value. The time dimension is important because at one time a link or site may be congested and at another it may have plenty of excess capacity. Analogously, space is important because at any one time while one link or site is congested, another may have excess capacity. A good cost function, for accuracy, will also deal with various measures of load. In the transportation industry, measures of load include number of units moved and weight.

The cost function may be an incremental method and allocate only available resources, beyond what has already been committed for the baseline. Or it may use a method of reallocation where all resources are reassigned but constrained to meet the existing commitments. Many instances of resource allocation can be represented mathematically as "a multi-commodity network flow problem". This formulation is especially appropriate for transportation services. Methods for solving the multi-commodity network flow problem are known, see for example, Ahuja, Magnanti, and Orlin, Network Flows—Theory, Algorithm and Applications, Chapter 17, Prentice Hall, 1993, incorporated by reference herein.

The fourth step is to determine the contract price range, considering the results from the third step which establishes the minimum of the range and any market data that is available which may contribute to an understanding of what the maximum should be.

In the final step the range is reported to the user through use of a report or through a user interface. The end user may select a price within the range according to other information available to him incorporated by reference herein.

In this invention, we assume the existence of one or more databases that include the data that the company uses for pricing purposes. Moreover, this invention is not limited by the specific content, organization, and location of the databases. Nor is this invention limited by the analysis methods used to create customer profiles from these databases.

Although the methods disclosed here were developed and will be first applied in the context of pricing a transportation service, this invention is not limited to that particular business domain. These methods can be applied in pricing contracts for any service where the service delivery window is significantly less than the contract duration. These methods are most applicable in instances where the customer demand for service can vary significantly across time intervals or when alternate resources can be used to meet these demands.

As an example of variable customer demand, consider a health maintenance organization (HMO) that wishes to attract customers (private or corporate) by offering a maximum wait time policy for treatment in one of its clinics. Under such a policy, the HMO guarantees that a patient subscribing to this "no-wait treatment" service is seen by a physician within a specified time, say 20 minutes, of his arrival to the clinic. Other patients may also be treated at the clinic, but may incur longer waiting times. Determining to which patients to offer this service, which locations will provide this service, and which days or hours to make this service available, as well as the fee to charge for such a service should take into account (1) the customer demand pattern of the patients to whom this service is being offered, (2) the available clinic resources such as examining rooms and physicians, and (3) other services, such as emergency care and scheduled appointments, that must be provided using these resources.

As an example of the use of alternate resources, consider a rental car company entering a contract with a large corporation in which the rental car company guarantees car availability, up to some maximum number of rentals per day, at some specified locations. The car rental company has the option of substituting a larger, more expensive car, or of transporting cars from one location to another to meet surges in demand. However, the cost of upgrades and of transporting cars should be considered in the pricing.

We note that the methods disclosed here are not likely to be applicable for pricing contracts for manufacturing goods or materials, particularly if the goods or materials can be produced in advanced and held in inventory in anticipation of customer requirements. These methods are also not applicable if the timing of service is not of significant importance to the customer. If service can be provided ahead of time, or significantly after the requested time, then it may be possible to balance the resource availability with the service requirements, and highly accurate costing methods are less critical.

An Illustrative Implementation of the Invention

We describe the implementation of this invention in the context of a contract pricing tool for an express package carrier. The detailed description of the input data and the details of the calculation steps are specific to this context. However, by substituting appropriate data and modifying the calculations, the basic sequence of steps can be applied to yield managed service contract pricing in a variety of business contexts.

Our implementation of the contract pricing tool is depicted in FIG. 1. The basic steps are described below with reference to the blocks in FIG. 1.

Step 1. Input Data

All input items are assumed to apply to a service delivery interval corresponding to daily activity. Since the shipping activity occurs on a daily basis, the aircraft schedule and its capacity are also specified on a daily basis.

Details of input files referenced to the architecture diagram are:

Shipping History (block 10):

detailed customer specific historical information about type, location, destination and timing of shipments.

fields: Customer Type, Customer ID, Account Number, Origin, Destination, Product (service type), Date, Weight Break, Shipments, Pieces, Total Weight, Revenue Cost Databases (block 11):

unit costs based on activity based costing (ABC) model.

fields: Origin, Destination, Product, Weight, Activity (e.g. pickup, linehaul), Driver Type, Unit Cost Baseline Flow (block 12):

summarized information about type, location, destination and timing of shipments for existing customers.

fields: Customer Type, Origin, Destination, Product (service type), Date, Weight Break, Shipments, Pieces, Total Weight, Revenue Network Schedule (block 13):

aircraft schedules fields: ID (scheduled route number), LDAY (list of local dates flights operated), ORG (origin of flight), DST (destination of flight), ZDEP (Zulu time of departure), ZARR (Zulu time of arrival), TYPE (aircraft type), OPRTR (operator of aircraft), MILES, BLK (block time), Cost (total cost), CAP (actual capacity of aircraft)

Network Location (block 14):

all service centers in modeled network.

fields: ID (IATA code), Name, Country Code, State Code, US Region, GMT (Greenwich Mean Time)

Network Resources (block 15):

other aircraft/truck resources that serve network (including purchased air)

fields: ID code, Type, CAP (actual, revenue capacity), Costs

Market Rates (block 16):

set of reference rates for customer's shipments which could include book rates, current customer rates, competitor rates, and prevailing spot rates for lanes.

fields: Product, Shipping Lane, Weight Break, Rate Type (e.g. book or competitor), Rate Pricing Guidelines (block 17):

price rate structure and applicable rate bounds location to area map: Location, Area lane map: Origin Area, Destination Area, Shipping Lane rate bounds fields: Product, Shipping Lane, Weight Break, Rule type (e.g. min, max, markup over cost)

Customer Characterization Data (block 18):
customer general and reference information
fields: Customer ID, Customer Type, Account ID(s), Regular pick-up locations, Call-ins, Special Handling, Customer Profile Reference Step 2: Customer Profiling (block 20)

Information, needed for costing, about the customer type and number of pick up locations is taken directly from the customer characterization. Using the customer shipping reference as a key, a suitable set of shipping history is then extracted for the customer. The information is grouped by a signature consisting of (Product Type, Origin, Destination). The detailed shipping history for each signature is then statistically summarized to produce estimates for the following information:

Nominal daily shipments, based on a fit to a Normal distribution using the sample mean and standard deviation Pieces per shipment, Distribution of shipments by weight at x lb increments, Distribution of shipments by day of week, Distribution of shipments by month.

This set of information collectively forms the profile for the customer.

Note that this profile is maintained as a dynamic object, able to respond to messages representing questions about daily shipping activity. For example to produce a particular day's expected Origin to Destination (OD) flow characterization for the Service Network Model the profile summarizes by Origin, Destination and across Products the shipping weight for that day. The day's shipping weight is in turn synthesized from the average daily shipment times the average weight and adjusted for the distribution across day of week and month of year.

Step 3: Cost Function (blocks 30, 31, 32)

A simple cost function is just a volume based function f(x) mapping non-negative numbers (volumes) to cost (typically non negative values). More complex cost functions take into account one or more of the following additional elements: the type of service, the service interval requirements, and the service location. In our example the type of service corresponds to the type of item being transported, for example, documents, small packages, and large packages. The service interval requirements correspond to same day delivery, overnight delivery, and 2-day delivery. The location of the service corresponds to the pickup (origin) and delivery (destination) of the package. For these complex cost functions the input may be specified as an ordered-tuple of numbers describing the customer demand, or as a data file or data base from which these elements are extracted. The output of a cost function is either a single number describing the cost of meeting this demand or an ordered m-tuple describing multiple cost components. In our example cost components include owned fleet costs, purchased air cargo costs, and ground costs. If a cost function includes as input a representation of the service network, it may also include as an output a representation of the resources that remain available after some of the resources in the network have been allocated to meet the demand. These remaining resources are referred to below as the residual service network.

Figure 2:
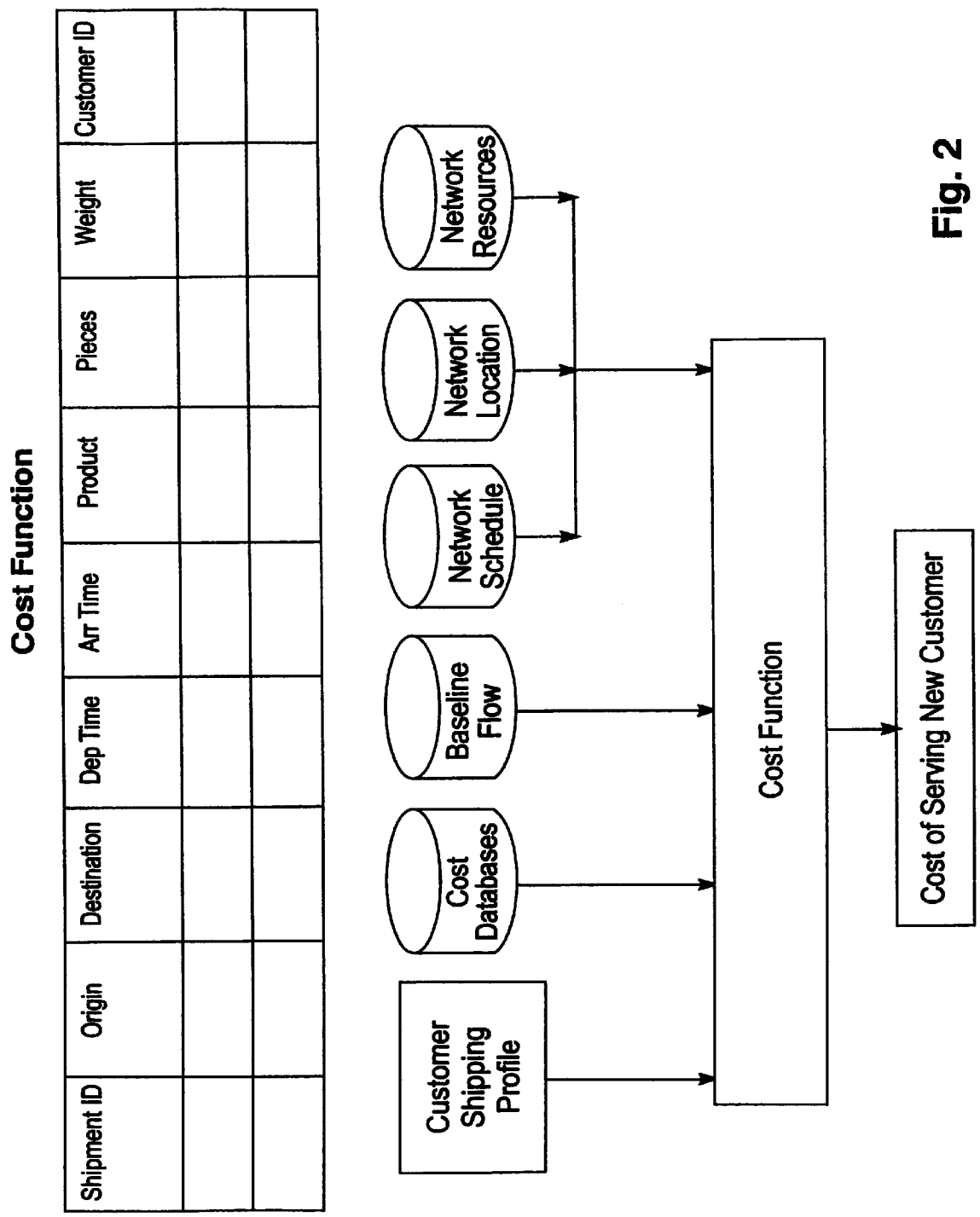

The inputs and the output of a our cost function are shown in FIG. 2. Note that in our implementation, the cost function comprises the blocks highlighted in the basic architecture diagram (FIG. 1).

Given a cost function, the incremental cost of a new customer can be computed using the following three steps.

Basic Method for Determining the Cost of a New Customer

3A. Use the baseline demand to compute a baseline cost.

3B. Use the baseline demand combined with the new customer demand to compute a total cost.

3C. Compute the incremental cost of the new customer as the total cost minus the baseline cost.

A detailed, highly accurate cost function may require using advanced mathematical methods to determine the optimal allocation of the service network resources. Such a function may require significant computation time, even on powerful computers. However, optimal allocation methods, such as linear programming, integer programming, and network programming typically provide as an output not only the optimal allocation of resources, but detailed information on the remaining, unallocated resources, that is, the residual service network. Therefore, in some instances it may be sufficient to approximate the incremental cost of a new customer through direct use of the resource allocation method as in the following steps.

Incremental Allocation Method of Costing a New Demand

3A. Use resource allocation method to determine the optimal allocation of the service network resources to meet the baseline demand, and to determine the remaining unallocated resources.

3B. Use the resource allocation method to determine the optimal allocation of the residual service network resources to the new customer demand.

3C. The cost of this second allocation step is an approximation for the cost of the new customer.

Since it is possible that a more cost effective allocation of the service network resources to the total demand could have been obtained by replacing some of the resources allocated to the baseline demand in step 3A with residual resources, and allocating these replaced resources to the new demand, the incremental allocation method over estimates the cost of serving the new customer.

Re-Allocation Method of Costing a New Demand

3A. Use resource allocation method to determine the optimal allocation of the service network resources to meet the combined baseline and new customer demands. For example The Service Network Model (SNM) takes the baseline network load input files and new customer OD flow information and finds the minimum cost set of routes and set of commodity flows from their origins to their destinations while satisfying service commitments and network capacity. Commodities are origin, destination and product type specific. The formulation of the model is following.

Notation:

k: commodity (origin, destination, product type specific)

$d^k$: demand of a commodity $k \epsilon K$ $O(k)$: origin of commodity $k \epsilon K$ $D(k)$: destination of commodity $k \epsilon K$ $P^k$: set of paths p from $O(k)$ to $D(k)$: for each $k \epsilon K$ $\delta_{ij}^p$: 1 if link $(i,j) \epsilon A$ belongs to $p \epsilon P^k$, 0 otherwise, where A is a set of links $\gamma_{ij}^r$: 1 if link $(i,j) \epsilon A$ belongs to $r \epsilon R$, 0 otherwise, where A is a set of links $c_p^k$: cost of sending one unit of commodity $k \epsilon K$ along a path $p \epsilon P^k$ $x_p^k$: flow of commodity $k \epsilon K$ along a path $p \epsilon p^k$ $Y_r$: decision variable for whether to use owned resource on route $r \epsilon R$ $l_r$: capacity of the route $r \in R$ $e_r$: cost of route $r \in R$ $Z_{ij}$: decision variable for whether to use purchased resource on a link $(i,j) \in A$ $m_{ij}$: purchased resource capacity on a link $(i,j) \in A$ $f_{ij}$: purchased resource cost between a link $(i,j) \in A$ $$\text{Minimize} \sum_{r \in R} e_r Y_r + \sum_{(i,j) \in A} f_{ij} Z_{ij} + \sum_{k \in K} \sum_{p \in P^k} c_p^k x_p^k \quad (1)$$

subject to:

$$-\sum_{r \in R} \gamma_{ij}^r l_r Y_r - m_{ij} Z_{ij} + \sum_{k \in K} \sum_{p \in P^k} \delta_{ij}^p x_p^k \leq 0, \quad \text{for all } (i,j) \in A \quad (2)$$

$$\sum_{k \in K} \sum_{p \in P^k} x_p^k = d^k, \quad \text{for all } k \in K \quad (3)$$

$$0 \leq Y_r \leq 1 \text{ and integer}, \quad \text{for all } r \in R \quad (4)$$

$$0 \leq Z_{ij} \leq 1 \text{ and integer}, \quad \text{for all } (i,j) \in A \quad (5)$$

$$0 \leq x_p^k \quad \text{for all } p \in P^k, k \in K \quad (6)$$

The objective function (1) is to minimize the total resource routing cost and total flow cost of commodities from their origins to their destinations. Constraints (2) guarantee that the total flow on arc (i,j) does not exceed capacity of (i,j), which is provided by privately owned resources and/or purchased resources. Constraints (3), imposed on each commodity, guarantee that flow is conserved from 0(k) to D(k). Constraints (4) and (5) ensure that resource variables are nonnegative and integer. Constraints (6) ensure that path flows are all nonnegative.

This Service Network Model is quite flexible to fit various situations. For example, when there are resource routing costs only and no costs associated with flow of demands, we set $c_p^k$ to zero. For certain cases, we may want to fix only $Y_r$ and let $Z_{ij}$ and $c_p^k$ be variables. In this case, we are assuming that all privately owned resource schedules are fixed while we investigate the possibility of introducing purchased resources in order to meet demand flows on an as-needed basis. When all resource schedules are already known and fixed so that there is no desire to change the schedules, two decision variables, $Y_r$ and $Z_{ij}$ will be removed from consideration and then only one type of variable remains—flow variables. This special case of SNM is frequently referred to as the multicommodity network flow problem (MCNF). The dual variables of constraints (3) of the MCNF can tell us costs associated with one unit increase of flow $d^k$ Therefore, when we think of the unit of demand as weight (i.e., pounds or kilos), the dual variables of constraints (3) can be interpreted as marginal cost of increasing one pound of demand between origin and destination for a specific product type.

The variability in demand that is important to account for is handled in the model by small time intervals (service delivery intervals) and multiple demand scenarios.

3B. (Step 3B has been combined with Step 3A).

3C. The resulting cost is an approximation for the cost of the new customer

Step 4: Generating a Price Range (block 40)

Various market data and company pricing guidelines may be used to determine the upper limit of the price range. In our implementation published book rates for both the company and its competitors, a competitive bid revealed by the customer, historical prices, and the desired margin are used. All will define a range.

Step 5: Reporting the Range (block 50)

The price range is made available to the pricing agent, either as a report or through a graphical user interface. For simple contracts the price range may be specified as a per-unit price. For more complex contracts, a price range may be give for each combination of the following demand qualifiers: service type, delivery interval requirement, and service location. Or the price range may specify ranges for various parameters in one of more formulas that are used to calculate the price.

The rates may be presented for each service and for each lane defined by an origin area and destination area, e.g., US to Europe. For instance, in FIG. 3, we show rates by weight break.

What is claimed:

1. A computer system comprising:
   1) means for inputting first information comprising a baseline profiling services contracted to zero or more existing customers, wherein the services consume resources over an extended period of time;
   2) means for inputting second information comprising a profile of the services to be contracted to one or more new customers, wherein the services consume resources over an extended period of time; and
   3) means for analyzing second information, to perform an analysis, in the context of said first information for determining a range of prices to be considered for the services to be contracted over an extended period of time,
   wherein said means for analyzing outputs said range of prices,
   wherein said means for analyzing performs the analysis with respect to third information associated with resources that are available for use in satisfying the one or more new customers' requirements,
   wherein said means for analyzing includes means for determining a possible allocation of the available resources to the set of requirements and computes a cost of the allocation, and
   wherein said possible allocation comprises generation of a hypothetical allocation, based on a forecast of generated scenarios of requirements.

2. A computer system according to claim 1, wherein the first information is selected from a group consisting of service requirement history, contractual obligations, cost information, and location information.

3. A computer system according to claim 1, wherein the second information is selected from a group consisting of proposed contractual obligations, cost information, and location information.

4. A computer system according to claim 3, wherein the second information is analyzed or augmented to include service requirements over at least one of specified service intervals, locations, and service classes.

5. A computer system according to claim 1, wherein said means for analyzing comprises a price range generator, said generator receiving said first and second information and calculating a price range for each new customer.

6. A computer system according to claim 1, further comprising means for outputting said price range.

7. The system of claim 1, wherein said means for determining a possible allocation includes utilizing at least one of linear programming, a network flow algorithm, and integer programming.

8. The system of claim 1, wherein said analysis uses a set of resources, and includes consideration of resource allocation.

9. The system of claim 1, wherein said analysis is for supporting sales of service contracts.

10. The system of claim 9, wherein the analysis is for pricing of service contracts spanning a predetermined period of time and which include a plurality of individual requests for service.

11. A computer implemented method comprising:
   1) inputting first information comprising a baseline profiling services contracted to zero or more existing customers, wherein the services consume resources over an extended period of time;
   2) inputting second information comprising a profile of the services to be contracted to one or more new customers, wherein the services consume resources over an extended period of time;
   3) performing an analysis by analyzing second information in the context of said first information for determining a range of prices to be considered for the services to be contracted over an extended period of time; and
   4) outputting said range of prices,
      wherein said analysis is performed with respect to third information associated with resources that are available for use in satisfying the one or more new customers' requirements,
      wherein said analyzing determines a possible allocation of the available resources to the set of requirements and computes a cost of the allocation, and
      wherein said possible allocation comprises generation of a hypothetical allocation, based on a forecast of generated scenarios of requirements.

12. A computer implemented method according to claim 11, wherein said analyzing of said second information comprises analyzing service requirements over specified time periods.

13. A computer implemented method according to claim 11, wherein said analyzing of said second information comprises analyzing service requirements over specified locations.

14. A computer implemented method according to claim 11, wherein said analyzing of said second information comprises analyzing service requirements based on resource usage.

15. A computer implemented method comprising:
   1) reading first input data associated with services to be provided to zero or more existing customers, wherein the services consume resources over an extended period of time;
   2) reading second input data associated with services being proposed for at least one new customer, wherein the services consume resources over an extended period of time;
   3) performing an analysis by analyzing said first and second data for creating at least one customer profile describing a demand for the services over an extended period of time;
   4) using a cost function for evaluating an incremental cost of adding a new customer requiring the service;
   5) using the incremental cost for determining a price range for the service to the new customer over an extended period of time; and
   6) outputting the price range,
      wherein said analysis is performed with respect to third input data associated with resources that are available for use in satisfying the one or more new customers' requirements,
      wherein said analyzing determines a possible allocation of the available resources to the set of requirements and computes a cost of the allocation, and
      wherein said possible allocation comprises generation of a hypothetical allocation, based on a forecast of generated scenarios of requirements.

16. A program storage device readable by a machine, tangibly embodying a program of instructions executable by the machine to perform method steps for yield managed service contract pricing, said method steps including:
   1) inputting first information comprising a baseline profiling services contracted to zero or more existing customers, wherein the services consume resources over an extended period of time;
   2) inputting second information comprising a profile of the services to be contracted to one or more new customers, wherein the services consume resources over an extended period of time;
   3) performing an analysis by analyzing second information in the context of said first information for determining a range of prices to be considered for the services to be contracted over an extended period of time; and
   4) outputting said range of prices,
      wherein said analysis is performed with respect to third information associated with resources that are available for use in satisfying the one or more new customers' requirements,
      wherein said analyzing determines a possible allocation of the available resources to the set of requirements and computes a cost of the allocation, and
      wherein said possible allocation comprises generation of a hypothetical allocation, based on a forecast of generated scenarios of requirements.

17. A computer system comprising:
   1) means for inputting first information comprising a baseline profiling services contracted to zero or more existing customers, wherein the services consume resources over an extended period of time;
   2) means for inputting second information comprising a profile of the services to be contracted to one or more new customers, wherein the services consume resources over an extended period of time; and
   3) means for analyzing second information, to perform an analysis, in the context of said first information for determining a range of prices to be considered for the services to be contracted over an extended period of time,
      wherein said means for analyzing outputs said range of prices,
      wherein said means for analyzing performs the analysis with respect to third information associated with resources that are available for use in satisfying the one or more new customers' requirements,
      wherein said means for analyzing includes means for determining a possible allocation of the available resources to the set of requirements and computes a cost of the allocation, and wherein said analysis is for supporting sales of service contracts,
      wherein the analysis is for pricing of service contracts spanning a predetermined period of time and which include a plurality of individual requests for service,
      wherein, once a service contract has been executed, the service provider is obligated to provide all requested services that are covered by the contract, for the price specified in the contract, such that the provider is unable to change a price on an existing contract in response to a resource shortage.

18. A computer system comprising:
1) means for inputting first information comprising a baseline profiling services contracted to zero or more existing customers, wherein the services consume resources over an extended period of time;
2) means for inputting second information comprising a profile of the services to be contracted to one or more new customers, wherein the services consume resources over an extended period of time; and
3) means for analyzing second information, to perform an analysis, in the context of said first information for determining a range of prices to be considered for the services to be contracted over an extended period of time,
wherein said means for analyzing outputs said range of prices,
wherein said means for analyzing performs the analysis with respect to third information associated with resources that are available for use in satisfying the one or more new customers' requirements,
wherein said means for analyzing includes means for determining a possible allocation of the available resources to the set of requirements and computes a cost of the allocation, and
wherein a price for a service provided for in a service contract is set in advance, in a predetermined term contract with service guarantees.

19. A computer system comprising:
1) means for inputting first information comprising a baseline profiling services contracted to zero or more existing customers wherein the services will consume resources over an extended period of time;
2) means for inputting second information comprising a profile of the services to be contracted for one or more new customers, wherein the services will consume resources over an extended period of time; and
3) means for analyzing second information in the context of first information for the purpose of determining a range of prices to be considered for the services to be contracted over an extended period of time,
wherein said means for analyzing outputs said range of prices.

* * * * *